US010336345B2

(12) United States Patent
Hatano

(10) Patent No.: US 10,336,345 B2
(45) Date of Patent: Jul. 2, 2019

(54) VEHICLE CONTROL SYSTEM, VEHICLE CONTROL METHOD, AND VEHICLE CONTROL PROGRAM WITH RESTRAINING HANDOVER OF DRIVING MODE

(71) Applicant: Honda Motor Co., Ltd., Tokyo (JP)

(72) Inventor: Kunimichi Hatano, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 151 days.

(21) Appl. No.: 15/424,153

(22) Filed: Feb. 3, 2017

(65) Prior Publication Data
US 2017/0240186 A1   Aug. 24, 2017

(30) Foreign Application Priority Data
Feb. 18, 2016   (JP) .................... 2016-028722

(51) Int. Cl.
*B60W 10/04*   (2006.01)
*B60W 10/18*   (2012.01)
(Continued)

(52) U.S. Cl.
CPC ............ *B60W 50/14* (2013.01); *B60W 10/04* (2013.01); *B60W 10/18* (2013.01); *B60W 10/20* (2013.01);
(Continued)

(58) Field of Classification Search
CPC .... B60W 50/14; B60W 10/20; B60W 50/087; B60W 30/09; B60W 30/182; B60W 30/095; B60W 10/18; B60W 10/04; B60W 30/18163; B60W 50/15; B60W 2550/402; B60W 2720/10; B60W 2420/42; B60W 2420/52; B60W 2710/20
See application file for complete search history.

(56) References Cited

U.S. PATENT DOCUMENTS

2012/0277947 A1* 11/2012 Boehringer ........... B60W 30/17
                                                        701/23
2014/0156133 A1*  6/2014 Cullinane ............. B60W 30/00
                                                        701/23
(Continued)

FOREIGN PATENT DOCUMENTS

JP          7-242164 A       9/1995

*Primary Examiner* — Jeffrey C Boomer
(74) *Attorney, Agent, or Firm* — Westerman, Hattori, Daniels & Adrian, LLP

(57) ABSTRACT

A vehicle control device includes the following components. An action plan generating unit generates an action plan of a vehicle. An automated driving control unit carries out a first driving mode in which at least one of acceleration/deceleration and steering of the vehicle is automatically controlled based on the action plan. An operation device accepts an operation performed by an occupant of the vehicle. A handover control unit instructs shifting to a second driving mode, in which the degree of automated driving is lower than in the first driving mode, when the occupant operates the operation device to instruct one or both of acceleration/deceleration and steering in the first driving mode. A restraint control unit generates an estimated path of the vehicle to be taken based on the operation and restrains shifting to the second driving mode if the estimated path contradicts the action plan.

11 Claims, 10 Drawing Sheets

(51) Int. Cl.
*B60W 10/20* (2006.01)
*B60W 30/09* (2012.01)
*B60W 30/095* (2012.01)
*B60W 30/18* (2012.01)
*B60W 30/182* (2012.01)
*B60W 50/08* (2012.01)
*B60W 50/12* (2012.01)
*B60W 50/14* (2012.01)

(52) U.S. Cl.
CPC .......... *B60W 30/09* (2013.01); *B60W 30/095* (2013.01); *B60W 30/182* (2013.01); *B60W 30/18163* (2013.01); *B60W 50/087* (2013.01); *B60W 50/12* (2013.01); *B60W 2420/42* (2013.01); *B60W 2420/52* (2013.01); *B60W 2550/402* (2013.01); *B60W 2710/20* (2013.01); *B60W 2720/10* (2013.01)

(56) References Cited

U.S. PATENT DOCUMENTS

| | | | | |
|---|---|---|---|---|
| 2014/0330478 A1* | 11/2014 | Cullinane | ............. | B60W 30/00 701/23 |
| 2015/0006028 A1* | 1/2015 | Strauss | ................... | B62D 1/28 701/36 |
| 2016/0001781 A1* | 1/2016 | Fung | ..................... | B60W 40/08 701/36 |
| 2016/0091896 A1* | 3/2016 | Maruyama | ............ | B60W 10/04 701/23 |
| 2016/0167652 A1* | 6/2016 | Slusar | ................. | B60W 30/143 701/27 |
| 2016/0167653 A1* | 6/2016 | Malone | ................. | B60W 10/18 701/23 |
| 2016/0185388 A1* | 6/2016 | Sim | .................... | B62D 15/0255 701/41 |
| 2016/0209841 A1* | 7/2016 | Yamaoka | ............. | G05D 1/0061 |
| 2016/0347327 A1* | 12/2016 | Kondo | .................. | B60W 50/14 |
| 2017/0151959 A1* | 6/2017 | Boesen | ..................... | A61B 5/18 |
| 2017/0153636 A1* | 6/2017 | Boesen | ................... | G06F 1/163 |
| 2017/0166222 A1* | 6/2017 | James | ................... | B60W 50/14 |
| 2017/0192429 A1* | 7/2017 | Tseng | ................... | G05D 1/0088 |
| 2017/0320495 A1* | 11/2017 | Lu | ......................... | B60W 10/06 |
| 2017/0349175 A1* | 12/2017 | Brandin | .................. | B60Q 1/34 |
| 2017/0364070 A1* | 12/2017 | Oba | ...................... | B60W 50/08 |
| 2018/0037223 A1* | 2/2018 | Goto | .................... | B60W 30/12 |

* cited by examiner

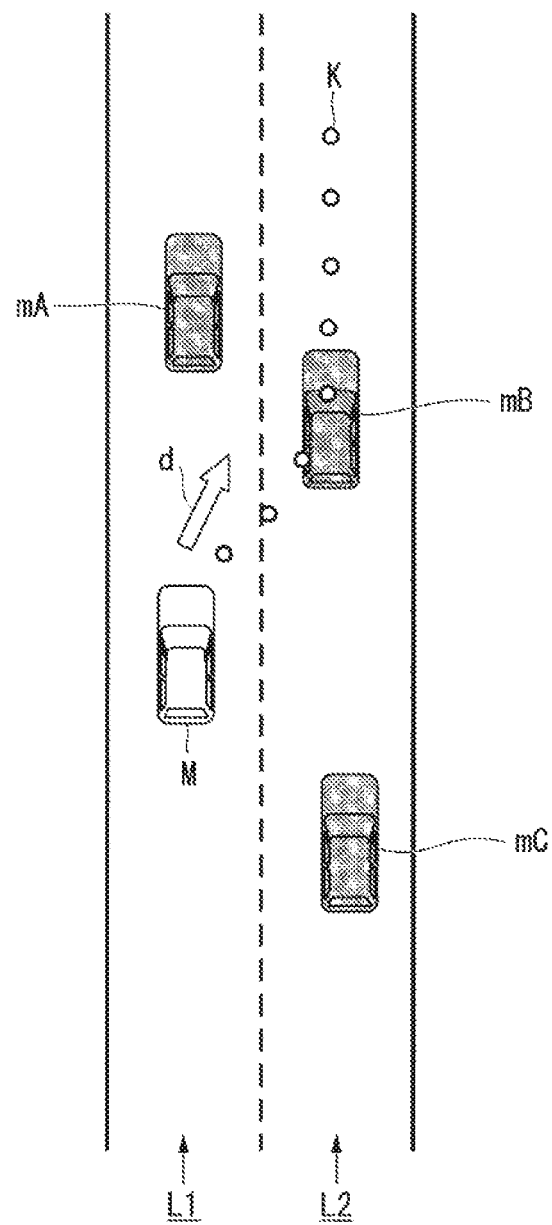

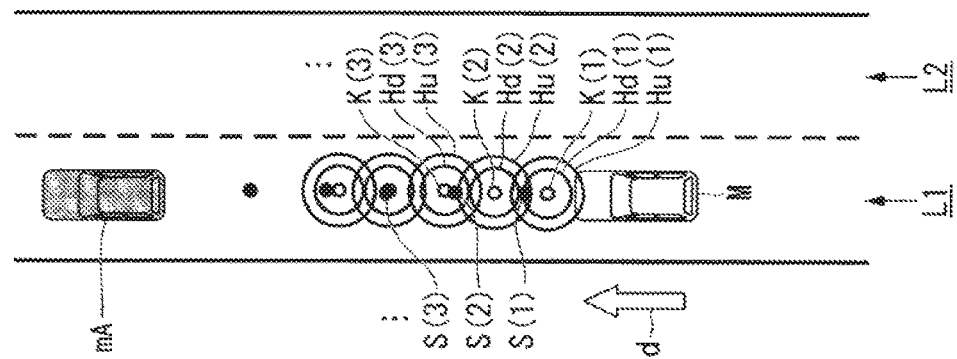
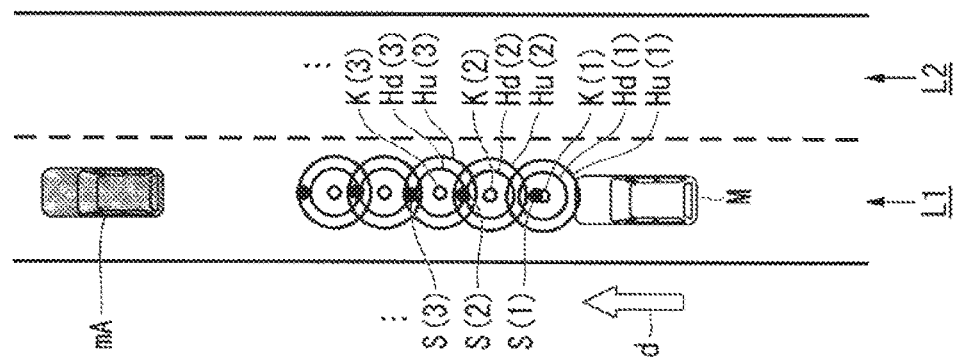
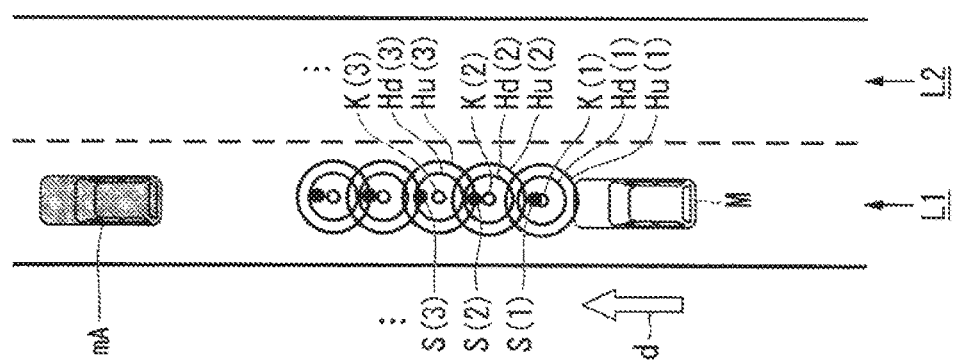

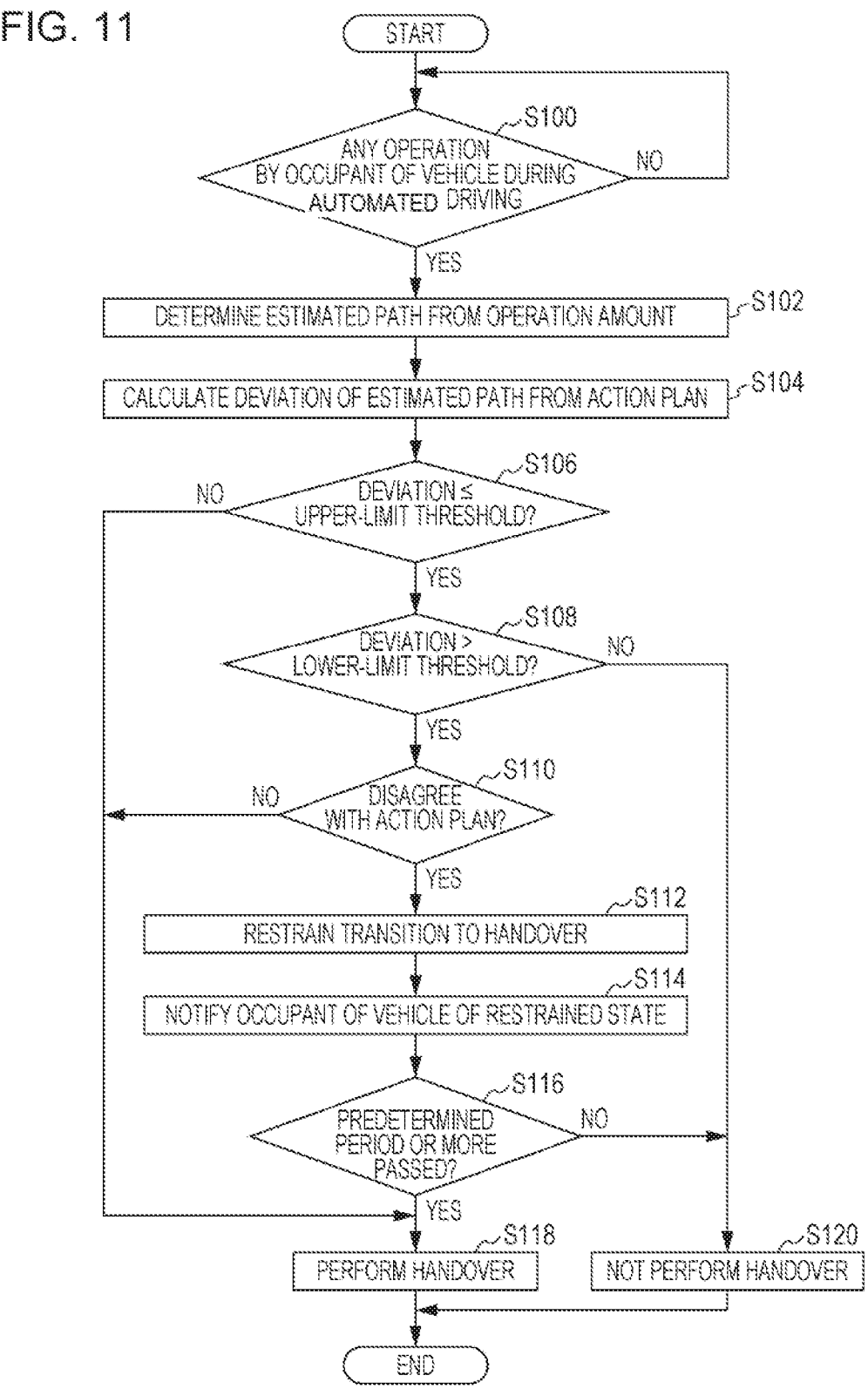

VEHICLE CONTROL SYSTEM, VEHICLE CONTROL METHOD, AND VEHICLE CONTROL PROGRAM WITH RESTRAINING HANDOVER OF DRIVING MODE

CROSS REFERENCES TO RELATED APPLICATIONS

The present application claims priority under 35U.S.C. § 119 to Japanese Patent Application No. 2016-028722, filed Feb. 18, 2016, entitled "Vehicle Control System, Vehicle Control Method, and Vehicle Control Program." The contents of this application are incorporated herein by reference in their entirety.

TECHNICAL FIELD

The present disclosure relates to a vehicle control system, a vehicle control method, and a vehicle control program.

BACKGROUND

For example, there are vehicles that detect a distance to an obstacle such as a vehicle located ahead, calculate a dangerous distance on the basis of the detected distance and the speed thereof, and issue an alert when the distance to the obstacle becomes equal to the dangerous distance, and a technique for automatically braking such vehicles when the distance to the obstacle becomes equal to the dangerous distance is disclosed (see, for example, Japanese Unexamined Patent Application Publication No. 7-242164).

Research on technologies for automatically controlling at least one of acceleration/deceleration and steering of a vehicle so that the vehicle travels along a route to a destination (hereinafter, referred to as "automated driving") has been conducted recently.

SUMMARY

An operation performed by an occupant of a vehicle is presumably used as a trigger when control for shifting from automated driving to manual driving is performed. However, inappropriate switching is performed in some cases with the technique of the related art.

The present application describes, for example, a vehicle control system, a vehicle control method, and a vehicle control program capable of performing appropriate switching from automated driving to manual driving.

According to a first aspect, there is provided a vehicle control system (1) including an action plan generating unit (116) that generates an action plan of a vehicle to a destination such that the vehicle travels along a route to the destination; an automated driving control unit (110) that carries out a first driving mode in which at least one of acceleration/deceleration and steering of the vehicle is automatically controlled on the basis of the action plan generated by the action plan generating unit; an operation device (70, 72, 74) that accepts an operation performed by an occupant of the vehicle; a handover control unit (132) that instructs the automated driving control unit to perform shifting to a second driving mode when the occupant of the vehicle performs an operation on the operation device to instruct one of or both of acceleration/deceleration and steering of the vehicle while the automated driving control unit is carrying out the first driving mode, the second driving mode being a mode in which a degree of automated driving is lower than in the first driving mode; and a restraint control unit (134) that generates an estimated path of the vehicle to be taken on the basis of the operation performed by the occupant of the vehicle to instruct one of or both of acceleration/deceleration and steering of the vehicle and restrains the handover control unit from instructing shifting from the first driving mode to the second driving mode if the generated estimated path contradicts the action plan generated by the action plan generating unit.

According to a second aspect, in the vehicle control system according to the first aspect, the action plan may be classified at least on the basis of whether lane changing is to be performed.

According to a third aspect, the vehicle control system according to the first or second aspect may further include a path generating unit (118) that generates an expected target path of the vehicle on the basis of a traveling mode determined by the action plan generating unit, wherein the restraint control unit may determine whether the generated estimated path contradicts the action plan generated by the action plan generating unit on the basis of the expected target path generated by the path generating unit and the generated estimated path.

According to a fourth aspect, in the vehicle control system according to the third aspect, the path generating unit may generate the expected target path by sampling target locations expected to be reached by the vehicle at respective time points at intervals of a predetermined period, and the restraint control unit may calculate, for each of the time points at intervals of the predetermined period, a deviation between the target location determined by the path generating unit for the time point and an estimated location for the time point estimated on the basis of the operation performed by the occupant of the vehicle to instruct one of or both of acceleration/deceleration and steering of the vehicle and may determine whether the estimated path contradicts the action plan on the basis of comparison of a value based on the calculated deviation with a threshold.

According to a fifth aspect, in the vehicle control system according to the fourth aspect, the restraint control unit may be configured not to restrain shifting to the second driving mode in the vehicle if the value based on the deviation exceeds an upper-limit threshold even in a case where it is determined that the estimated path contradicts the action plan.

According to a sixth aspect, in the vehicle control system according to the fifth aspect, the restraint control unit may perform control such that the handover control unit does not instruct shifting from the first driving mode to the second driving mode if the value based on the deviation is smaller than or equal to a lower-limit threshold.

According to a seventh aspect, in the vehicle control system according to the sixth aspect, the restraint control unit may perform control to restrain an operation performed by the occupant of the vehicle by applying an operation reaction force to the operation device if the value based on the deviation is larger than the lower-limit threshold and is smaller than or equal to the upper-limit threshold.

According to an eighth aspect, the vehicle control system according to the sixth or seventh aspect may further include an output unit (82) that outputs information, wherein the restraint control unit may restrain an operation performed on the operation device if the value based on the deviation is larger than the lower-limit threshold and is smaller than or equal to the upper-limit threshold and may cause the output unit to output information indicating that the operation is restrained.

According to a ninth aspect, there is provided a vehicle control method performed by a computer mounted in a vehicle, including generating an action plan of the vehicle to a destination such that the vehicle travels along a route to the destination; carrying out a first driving mode in which at least one of acceleration/deceleration and steering of the vehicle is automatically controlled on the basis of the generated action plan; instructing shifting to a second driving mode when an occupant of the vehicle performs an operation on an operation device to instruct one of or both of acceleration/deceleration and steering of the vehicle while the first driving mode is carried out, the second driving mode being a mode in which a degree of automated driving is lower than in the first driving mode, the operation device being a device that accepts an operation performed by the occupant of the vehicle; and generating an estimated path of the vehicle to be taken on the basis of the operation performed by the occupant of the vehicle to instruct one of or both of acceleration/deceleration and steering of the vehicle and restraining shifting from the first driving mode to the second driving mode if the generated estimated path contradicts the action plan.

According to a tenth aspect, there is provided a vehicle control program causing a computer mounted in a vehicle to execute a process including generating an action plan of the vehicle to a destination such that the vehicle travels along a route to the destination; carrying out a first driving mode in which at least one of acceleration/deceleration and steering of the vehicle is automatically controlled on the basis of the generated action plan; instructing shifting to a second driving mode when an occupant of the vehicle performs an operation on an operation device to instruct one of or both of acceleration/deceleration and steering of the vehicle while the first driving mode is carried out, the second driving mode being a mode in which a degree of automated driving is lower than in the first driving mode, the operation device being a device that accepts an operation performed by the occupant of the vehicle; and generating an estimated path of the vehicle to be taken on the basis of the operation performed by the occupant of the vehicle to instruct one of or both of acceleration/deceleration and steering of the vehicle and restraining shifting from the first driving mode to the second driving mode if the generated estimated path contradicts the action plan. In the above explanation of the exemplary aspects of embodiment, specific elements with their reference numerals are Indicated by using brackets. These specific elements are presented as mere examples in order to facilitate understanding, and thus, should not be interpreted as any limitation to the accompanying claims.

According to the first, ninth, and tenth aspects, the vehicle control system, the vehicle control method, and the vehicle control program successfully enables appropriate switching control from automated driving to manual driving by restraining switching to manual driving when an occupant of a vehicle performs inappropriate manual driving.

According to the second aspect, the vehicle control system successfully determines a path that denies a lane changing action plan as a path that contradicts the action plan. Specifically, since automated lane changing highly requires continuous control, appropriate switching control that satisfies such a requirement is successfully performed.

According to the third aspect, the vehicle control system successfully determines whether the generated estimated path contradicts the action plan appropriately by comparing the estimated path with the expected target path.

According to the fifth aspect, since it is considered that the occupant of the vehicle intends to drive the vehicle by performing a manual operation, the vehicle control system respects their intention and successfully implements driving control in which the operation of the occupant of the vehicle is prioritized.

According to the sixth aspect, since the vehicle control system does not perform shifting from the first driving mode to the second driving mode when the deviation is small or substantially zero, the driving control load of the vehicle control system is successfully reduced and the efficiency is successfully improved.

According to the seventh aspect, the vehicle control system successfully enables the occupant of the vehicle to recognize that the operation is restrained appropriately by applying an operation reaction force to the operation device.

According to the eighth aspect, since the vehicle control system successfully enables the occupant of the vehicle to recognize that their manual operation is restrained through the notification made by the output unit, the vehicle control system successfully performs appropriate driving control without making the occupant feel differently from their familiar manner when the occupant performs the manual operation.

BRIEF DESCRIPTION OF THE DRAWINGS

The advantages of the disclosure will become apparent in the following description taken in conjunction with the following drawings.

FIG. 7 is a diagram illustrating how a path for lane changing is generated.

FIGS. 10A to 10C are diagrams each illustrating an example of how speed corresponding to an operation of an accelerator pedal is regulated.

FIG. 11 is a flowchart illustrating an example of a switching control process according to the embodiment.

DETAILED DESCRIPTION

A vehicle control system, a vehicle control method, and a vehicle control program according to an embodiment of the present disclosure will be described below with reference to the accompanying drawings.

Configuration of Vehicle

Figure 1:
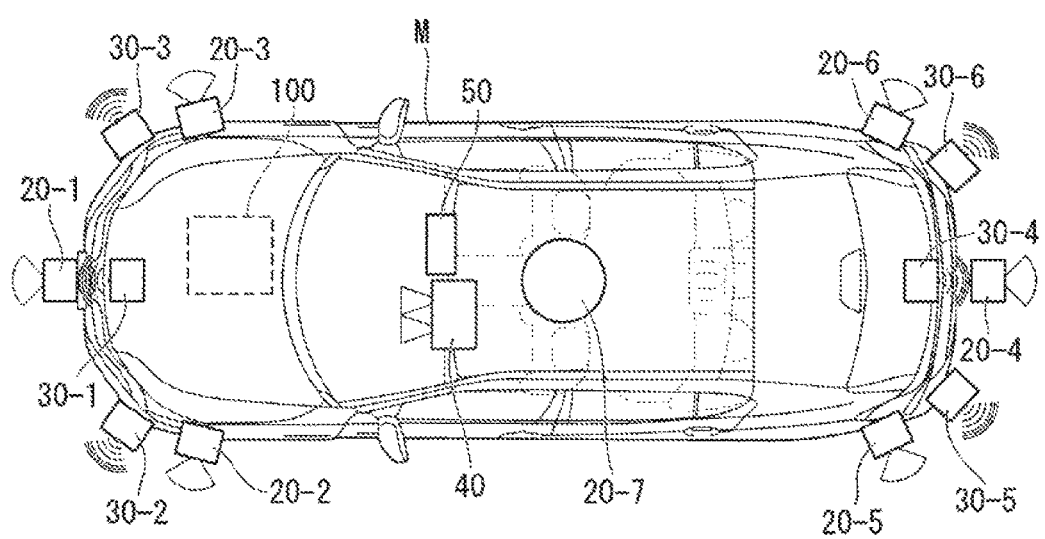
FIG. 1 is a diagram illustrating components of a vehicle in which a vehicle control system according to an embodiment is mounted.

FIG. 1 is a diagram illustrating components of a vehicle (hereinafter, referred to as a "vehicle M") in which the vehicle control system according to the embodiment is mounted. The vehicle in which a vehicle control device 100 included in the vehicle control system is mounted is a vehicle with two, three, or four wheels, for example. Examples of such a vehicle include a vehicle that uses an internal combustion engine such as a diesel engine or a gasoline engine as its power source, an electric vehicle that uses a motor as its power source, a hybrid vehicle including both an internal combustion engine and a motor, and so forth. In addition, the aforementioned electric vehicle is driven by using electric power obtained by discharge of a battery cell, such as a secondary battery cell, a hydrogen fuel cell, a metal fuel cell, or an alcohol fuel cell, for example.

As illustrated in FIG. 1, the vehicle M includes sensors such as rangefinders 20-1 to 20-7, radars 30-1 to 30-6, and a camera 40; a navigation system 50; and the vehicle control device 100. Each of the rangefinders 20-1 to 20-7 is, for example, a LIDAR (Light Detection and Ranging or Laser Imaging Detection and Ranging) device that measures scattered light of emitted light to measure a distance to a target. For example, the rangefinder 20-1 is attached to the front grille or the like. Each of the rangefinders 20-2 and 20-3 is attached to a side of the body of the vehicle, a sideview mirror, inside of a headlamp, a portion near a side marker lamp, or the like. The rangefinder 20-4 is attached to a trunk lid or the like. Each of the rangefinders 20-5 and 20-6 is attached to a side of the body of the vehicle, inside of a rear position lamp, or the like. The aforementioned rangefinders 20-1 to 20-6 have a horizontal-direction detection range of about 150 degrees, for example. The rangefinder 20-7 is attached to the roof or the like. The rangefinder 20-7 has a horizontal-direction detection range of about 360 degrees, for example.

The aforementioned radars 30-1 and 30-4 are, for example, long-range millimeter wave radars having a wider depth-direction detection range than the other radars. In addition, the radars 30-2, 30-3, 30-5, and 30-6 are middle-range millimeter wave radars having a narrower depth-direction detection range than the radars 30-1 and 30-4. Hereinafter, the rangefinders 20-1 to 20-7 are simply referred to as "rangefinders 20" when they are not particularly distinguished from one another, and the radars 30-1 to 30-6 are simply referred to as "radars 30" when they are not particularly distinguished from one another. Each of the radars 30 detects whether there is an object (for example, a nearby vehicle (another vehicle) or an obstacle) around the vehicle M, and detects the distance to the object and the relative speed or the like by using FM-CW (Frequency Modulated Continuous Wave) method, for example.

The camera 40 is, for example, a digital camera that uses a solid-state imaging element, such as a CCD (Charge Coupled Device) or CMOS (Complementary Metal Oxide Semiconductor) imaging element. The camera 40 is attached to an upper portion of the front windshield, the back surface of the rearview mirror, or the like. The camera 40 periodically captures an image of a scene in front of the vehicle M, for example.

Note that the configuration illustrated in FIG. 1 is merely an example, and part of the configuration may be omitted or another configuration may be further added.

Functional Configuration

Figure 2:
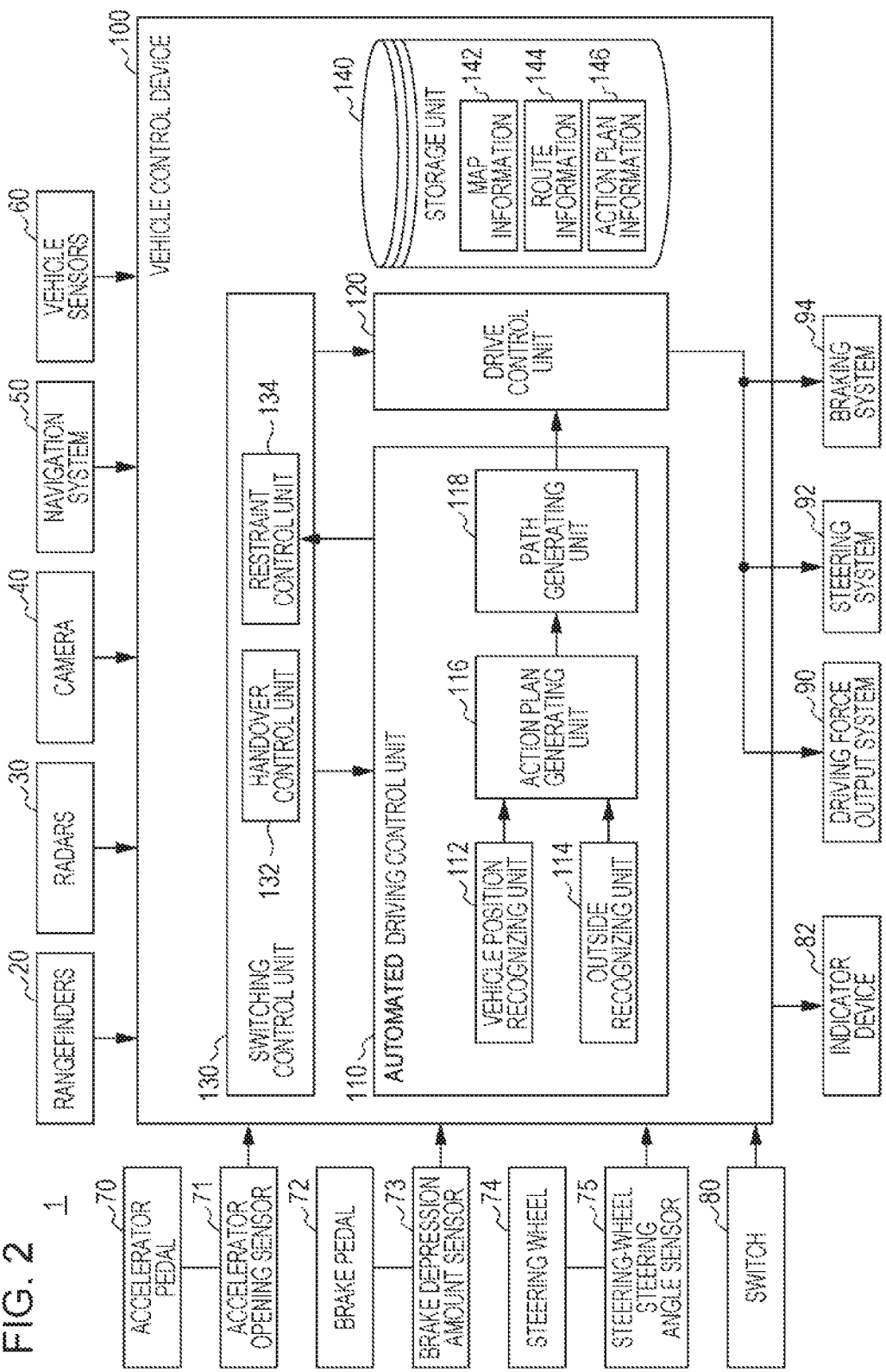
FIG. 2 is a functional configuration diagram of the vehicle control system according to the embodiment.

FIG. 2 is a functional configuration diagram of a vehicle control system 1 according to the embodiment. In addition to the rangefinders 20, the radars 30, and the camera 40, the vehicle control system 1 includes the navigation system 50; vehicle sensors 60; operation devices such as an accelerator pedal 70, a brake pedal 72, and a steering wheel 74; operation detection sensors such as an accelerator opening sensor 71, a brake depression amount sensor (brake switch) 73, and a steering-wheel steering angle sensor (or steering torque sensor) 75; a switch 80; an indicator device (output unit) 82; a driving force output system 90, a steering system 92; a braking system 94; and the vehicle control device 100. These systems and devices are connected to one another via a multiplex communication line such as a CAN (Controller Area Network) communication line, a serial communication line, a wireless communication network, or the like. Note that the aforementioned operation devices are merely an example, and the vehicle M may be equipped with a joystick, buttons, a dial switch, or a GUI (Graphical User Interface)-based switch.

The navigation system 50 includes a GNSS (Global Navigation Satellite System) receiver, map information (map for navigation), a touchscreen display device that functions as a user interface, a speaker, and a microphone. The navigation system 50 identifies the location of the vehicle M by using the GNSS receiver and determines a route from the identified location to the destination specified by the user. The route determined by the navigation system 50 is stored as route information 144 in a storage unit 140. The location of the vehicle M may be identified or compensated for by an INS (Inertial Navigation System) that uses the output of the vehicle sensors 60. The navigation system 50 provides the route to the destination by audio or displaying when the vehicle control device 100 is carrying out a manual driving mode. The configuration used to identify the location of the vehicle M may be provided independently from the navigation system 50. In addition, the navigation system 50 may be implemented as one of functions of a user's terminal device, such as a smartphone or tablet terminal, for example. In this case, the terminal device and the vehicle control device 100 exchange information via wired or wireless communication.

The vehicle sensors 60 include a vehicle speed sensor that detects the speed of the vehicle M, an acceleration sensor that detects acceleration, a yaw-rate sensor that detects an angular velocity around the vertical axis, and a direction sensor that detects the direction in which the vehicle M is heading, for example.

The operation detection sensors output detection results such as the accelerator opening, the brake depression amount, and the steering-wheel steering angle to the vehicle control device 100. Instead of this configuration, the detection results obtained by the operation detection sensors may be output directly to the driving force output system 90, the steering system 92, or the braking system 94 depending on the driving mode.

The switch 80 is a switch operated by an occupant of the vehicle M. The switch 80 accepts an operation performed by the occupant of the vehicle M and switches the driving mode (between an automated driving mode (first driving mode) and a manual driving mode (second driving mode), for example) in accordance with the accepted operation. For example, the switch 80 generates a driving mode specifying signal that specifies the driving mode of the vehicle M on the basis of the operation performed by the occupant of the vehicle M and outputs the driving mode specifying signal to a switching control unit 130.

The indicator device 82 is one of various devices capable of outputting information. The indicator device 82 outputs, for example, information that prompts the occupant of the vehicle M to shift from an automated driving mode to a manual driving mode. For example, at least one of a speaker, a vibrator, a display device, and a light-emitting device may be used as the indicator device 82.

For example, the driving force output system 90 includes an engine and an engine ECU (Electronic Control Unit) that controls the engine if the vehicle M is a vehicle that uses an internal combustion engine as its power source. The driving force output system 90 includes a drive motor and a motor ECU that controls the drive motor if the vehicle M is an electric vehicle that uses a motor as its power source. The driving force output system 90 includes an engine, an engine ECU, a drive motor, and a motor ECU if the vehicle M is a hybrid vehicle. If the driving force output system 90 includes an engine alone, the engine ECU adjusts the throttle opening of the engine and the gear in accordance with information input thereto from a drive control unit 120 (described later) and outputs a driving force (torque) that causes the vehicle M to travel. In addition, if the driving force output system 90 includes a drive motor alone, the motor ECU adjusts the duty ratio of a PWM (Pulse Width Modulation) signal supplied to the drive motor in accordance with information input thereto from the drive control unit 120 and outputs the driving force described above. In addition, if the driving force output system 90 includes an engine and a drive motor, the engine ECU and the motor ECU cooperate with each other in accordance with information input thereto from the drive control unit 120 to control the driving force.

The steering system 92 includes, for example, an electric motor. For example, the electric motor applies a force to a rack-and-pinion mechanism to change the direction of steered wheels. The steering system 92 drives the electric motor in accordance with information input, thereto from the drive control unit 120 to change the direction of steered wheels.

The braking system 94 is, for example, an electric servo braking system including brake calipers, a cylinder that transmits hydraulic pressure to the brake calipers, an electric motor that, produces hydraulic pressure in the cylinder, and a braking control unit. The braking control unit of the electric servo braking system controls the electric motor in accordance with information input, thereto from the drive control unit 120 so that a braking torque (braking force output, device) that produces a braking force corresponding to a braking operation is output to each wheel. The electric servo braking system may include a backup mechanism that transmits hydraulic pressure produced in response to an operation of the brake pedal to the cylinder via a master cylinder. Note that the braking system 94 is not limited to the electric servo braking system described above and may be an electrically controlled hydraulic braking system. The electrically controlled hydraulic braking system controls an actuator in accordance with information input thereto from the drive control unit 120 and transmits hydraulic pressure at the master cylinder to the cylinder. In addition, the braking system 94 may include a regenerative brake that involves the drive motor that can be included in the driving force output system 90.

Vehicle Control Device

The vehicle control device 100 will be described below. The vehicle control device 100 includes, for example, an automated driving control unit 110, the drive control unit 120, the switching control unit 130, and the storage unit 140. The automated driving control unit 110 includes, for example, a vehicle position recognizing unit 112, an outside recognizing unit 114, an action plan generating unit 116, and a path generating unit 118. Some or all of the units of the automated driving control unit 110, the drive control unit 120, and the switching control unit 130 are implemented as a result of a processor, such as a CPU (Central Processing Unit), executing a program. In addition, the some or all of the units of the automated driving control unit 110, the drive control unit 120, and the switching control unit 130 may be implemented by hardware, such as an LSI (Large Scale Integration) or ASIC (Application Specific Integrated Circuit) chip. In addition, the storage unit 140 is implemented by a ROM (Read Only Memory), a RAM (Random Access Memory), a HDD (Hard Disk Drive), a flash memory, or the like. A program that is executed by the processor may be stored in the storage unit 140 in advance or may be downloaded from an external device via on-vehicle Internet-connection equipment or the like. In addition, the program may be installed in the storage unit 140 as a result of a portable storage medium storing the program thereon being put in a drive (not illustrated). The vehicle control device 100 may be implemented by a plurality of computers in a distributed manner. In such a way, an on-vehicle computer of the vehicle M is capable of implementing various processes of the embodiment by causing the above-described hardware functional units and software such as the program to cooperate together.

The automated driving control unit 110 performs control by switching the driving mode in accordance with an instruction given from the switching control unit 130. The driving modes include a driving mode (automated driving mode) in which acceleration/deceleration and steering of the vehicle M are automatically controlled and a driving mode (manual driving mode) in which acceleration/deceleration of the vehicle M is controlled on the basis of operations of the operation devices such as the accelerator pedal 70 and the brake pedal 72 and in which steering is controlled on the basis of an operation of the operation device such as the steering wheel 74. The driving modes are not limited to these modes, and the driving modes may include a driving mode (semi-automated driving mode) in which one of acceleration/deceleration and steering of the vehicle M is automatically controlled and the other is controlled on the basis of an operation of the operation device(s).

For example, when the first driving mode is the automated driving mode, the second driving mode may be the manual driving mode or the semi-automated driving mode. When the first driving mode is the semi-automated driving mode, the second driving mode is the manual driving mode. That is, the second driving mode is a mode in which the degree of automated driving is lower than in the first driving mode. The following description will be given on the assumption that the first driving mode is the automated driving mode and the second driving mode is the manual driving mode. When the manual driving mode is carried out, the automated driving control unit 110 may stop operating and input signals from the operation detection sensors may be supplied to the drive control unit 120 or directly to the driving force output system 90, the steering system 92, or the braking system 94.

The automated driving control unit 110 includes the vehicle position recognizing unit 112, the outside recognizing unit 114, the action plan generating unit 116, and the path generating unit 118. The vehicle position recognizing unit 112 recognizes the lane where the vehicle M is traveling (current lane) and the relative position of the vehicle M in the current lane on the basis of map information 142 stored in the storage unit 140 and information input thereto from the rangefinders 20, the radars 30, the camera 40, the navigation system 50, and the vehicle sensors 60. The map information 142 is, for example, map information having a higher precision than the map for navigation included in the navigation system 50 and includes information concerning the center of each of lanes, the boundary of the lanes, and so forth. More specifically, the map information 142 includes information such as road information, traffic regulation information, address information (addresses/zip codes), facility information, and phone number information. The road information includes information representing the type of the road, such as a highway, a toll road, a national route, or a prefectural road and information such as the number of lanes of the road, the width of each of the lanes, the slope of the road, the location of the road (three-dimensional coordinates including the latitude, the longitude, and the altitude), the curvature of each curve of each lane, the locations of merging and branching points of each lane, and the signs provided at the road. The traffic regulation information includes information concerning each lane that is closed due to a road construction, a traffic accident, or a traffic jam.

Figure 3:
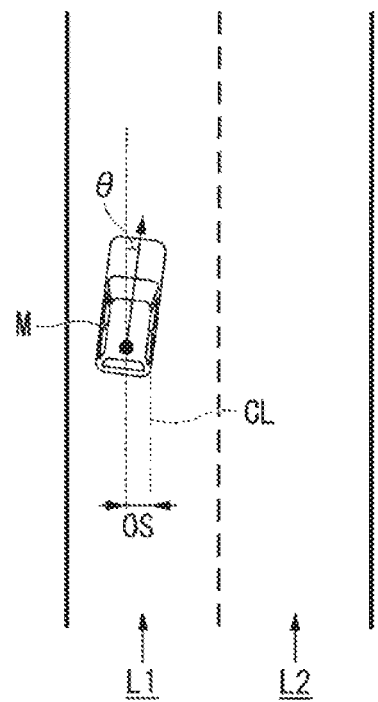
FIG. 3 is a diagram illustrating how the relative position of a vehicle in a lane where the vehicle is traveling is recognized by a vehicle position recognizing unit.

FIG. 3 is a diagram illustrating how the vehicle position recognizing unit 112 recognizes the relative position of the vehicle M in a current lane L1. The vehicle position recognizing unit 112 recognizes, for example, a divergence OS of a reference point (for example, the center of gravity) of the vehicle M from the center CL of the current lane L1 and an angle θ between the direction in which the vehicle M is traveling and the line extending at the center CL of the current lane L1 as the relative position of the vehicle M in the current lane L1. Instead of these parameters, the vehicle position recognizing unit 112 may recognize the position of the reference point of the vehicle M relative to one of the side ends of the current lane L1 as the relative position of the vehicle M in the current lane L1.

The outside recognizing unit 114 recognizes states such as the position, speed, and acceleration of each nearby vehicle on the basis of information input thereto from the rangefinders 20, the radars 30, and the camera 40. In the embodiment, a nearby vehicle is a vehicle that travels near the vehicle M in the same direction as the direction in which the vehicle M travels. The position of the nearby vehicle may be represented by a representative point, such as the center of gravity or corner of the vehicle or may be represented by an area expressed by the outline of the vehicle. The "states" of a nearby vehicle may include acceleration of the nearby vehicle and whether the nearby vehicle is performing (or is about to perform) lane changing depending on the information from the aforementioned various devices. The outside recognizing unit 114 may recognize the positions of other objects, such as guard rails, utility poles, parked vehicles, and pedestrians in addition to the positions of the nearby vehicles.

The action plan generating unit 116 sets the start point of automated driving, the expected end point of automated driving, and/or the destination of automated driving. The start point of automated driving may be the current location of the vehicle M or the point at which the occupant of the vehicle M has performed an operation for instructing automated driving. The action plan generating unit 116 generates an action plan for a section from the start point to the expected end point or a section from the start point to the destination of automated driving. Note that the section is not limited to these sections, and the action plan generating unit 116 may generate an action plan for any given section.

An action plan is composed of a plurality of sequentially performed events, for example. Examples of events include an deceleration event for decelerating the vehicle M, an acceleration event for accelerating the vehicle M, a lane keeping event for causing the vehicle M to travel without departing from the current lane, a lane changing event for changing the lane, an overtaking event for causing the vehicle M to overtake its preceding vehicle, a branching event for causing the vehicle M to change the lane to a desired lane at the branching point or to travel without departing from the current lane at the branching point, and a merging event for accelerating or decelerating the vehicle M on the merging lane for merging with the main lane and then causing the vehicle M to change the lane. For example, if there is a junction (branching point) in a toll road (for example, highway), the vehicle control device 100 causes the vehicle M to change or keep the lane so that the vehicle M travels in the direction of the destination. Accordingly, if the action plan generating unit 116 determines that there is a junction along a path with reference to the map information 142, it sets a lane changing event for changing the lane to a desired lane with which the vehicle M can travel to the direction of the destination within a section from the current location (coordinates) of the vehicle M to the location (coordinates) of the junction. Mote that information representing the action plan generated by the action plan generating unit 116 is stored as action plan information 146 in the storage unit 140.

Figure 4:
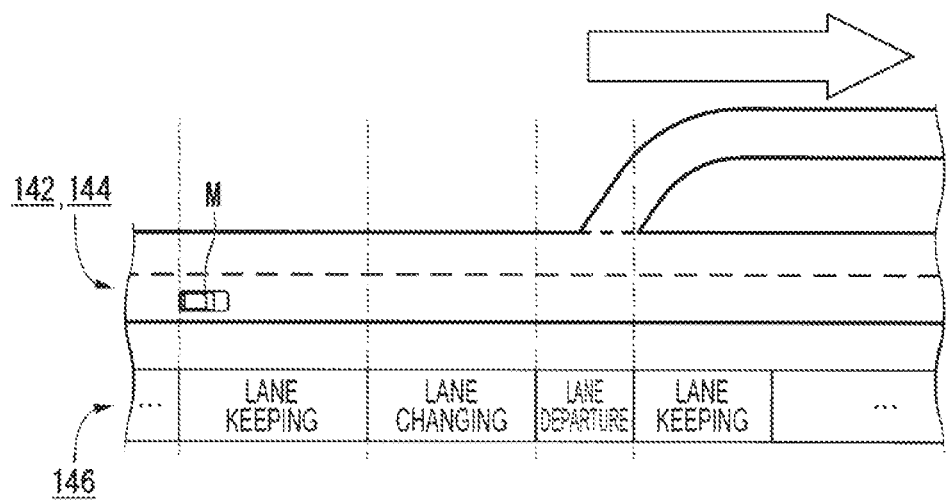
FIG. 4 is a diagram illustrating an example of an action plan generated for a certain section.

FIG. 4 is a diagram illustrating an example of an action plan generated for a certain section. As illustrated in FIG. 4, the action plan generating unit 116 classifies situations that may be encountered if the vehicle M travels along a path to the destination and generates an action plan so that events corresponding to the respective situations are carried out. Mote that the action plan generating unit 116 may dynamically change the action plan in accordance with a change in the situation where the vehicle M is in.

The action plan generating unit 116 may change (update) the generated action plan on the basis of the outside state recognized by the outside recognizing unit 114, for example. In general, the outside state changes all the time while the vehicle is traveling. In particular, in the case where the vehicle M travels on the road having a plurality of lanes, distances to respective nearby vehicles change relatively. For example, when a preceding vehicle decelerates in response to sudden braking or a vehicle traveling on the next lane cuts in front of the vehicle M, the vehicle M needs to travel while appropriately changing the speed or lane in accordance with the behavior of the preceding vehicle and the vehicle on the next lane. Accordingly, the action plan generating unit 116 may change the event set for each control section in accordance with the change in the outside state described above.

Specifically, the action plan generating unit 116 changes the event set for a driving section where the vehicle M is expected to travel, if the speed of a nearby vehicle recognized by the outside recognizing unit 114 exceeds a threshold or a nearby vehicle traveling on the next lane moves toward the lane of the vehicle M while the vehicle M is traveling. For example, suppose that events are set such that a lane changing event follows a lane keeping event. In such a case, if the recognition result obtained by the outside recognizing unit 114 during the lane keeping event indicates that a vehicle located behind is traveling at a speed of a threshold or higher on a lane to which a lane change is to be made, the action plan generating unit 116 changes the event that follows the lane keeping event from the lane changing event to a deceleration event or a lane keeping event, for example. As a result, the vehicle control device 100 successfully implements safe automated driving of the vehicle M even if the outside state changes.

Lane Keeping Event

When performing a lane keeping event, the action plan generating unit 116 selects a traveling mode from among a constant-speed mode, a follow mode, a deceleration mode, a curve mode, and an obstacle avoiding mode. For example, the action plan generating unit 116 selects the constant-speed mode as the traveling mode when there is no vehicle ahead of the vehicle M. The action plan generating unit 116 selects the follow mode as the traveling mode when the vehicle M follows the preceding vehicle. The action plan generating unit 116 selects the deceleration mode as the traveling mode when deceleration of the preceding vehicle is recognized by the outside recognizing unit 114 or the vehicle M performs a stopping or parking event. The action plan generating unit 116 selects the curve mode as the traveling mode when the outside recognizing unit 114 recognizes that the vehicle M is approaching a curve. The action plan generating unit 116 selects the obstacle avoiding mode as the traveling mode when an obstacle is recognized in front of the vehicle M by the outside recognizing unit 114.

The path generating unit 118 generates an expected target path of the vehicle M on the basis of the traveling mode selected by the action plan generating unit 116. The path generating unit 118 also outputs the generated path to the drive control unit 120 and the switching control unit 130. A path is a collection (trajectory) of sampled points obtained by sampling, at predetermined intervals, target locations expected to be reached when the vehicle M travels in the traveling mode selected by the action plan generating unit 116. The path generating unit 118 calculates at least the target speed of the vehicle M on the basis of the speed of the target object located ahead of the vehicle M and the distance from the vehicle M to the target object, which are recognized by the vehicle position recognizing unit 112 and the outside recognizing unit 114. The path generating unit 118 generates a path on the basis of the calculated target speed. Examples of the target object include a preceding vehicle; points such as a merging point, a branching point, and a destination point; and objects such as an obstacle.

Figure 5D:
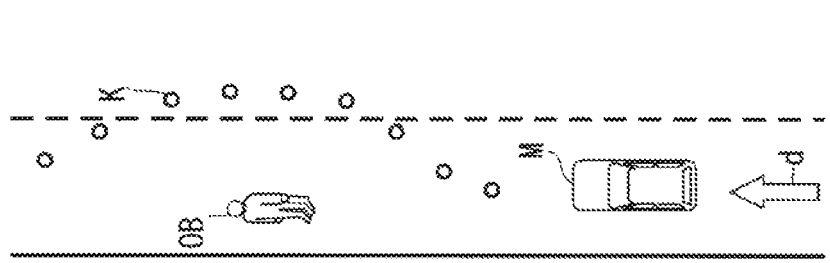
FIGS. 5A to 5D are diagrams each illustrating an example of a path generated by a path generating unit.
Figure 5C:
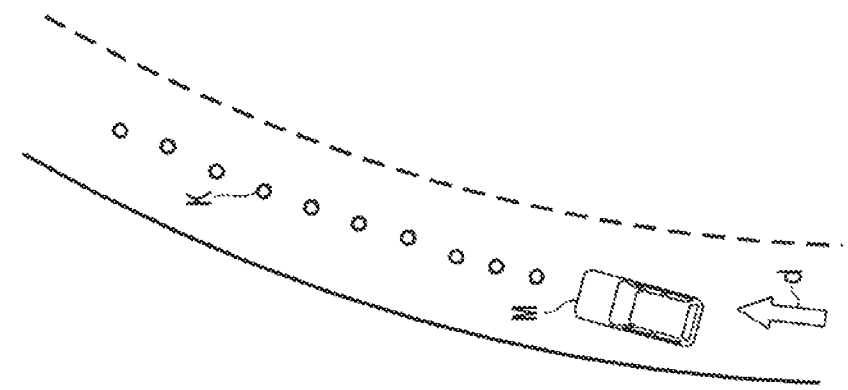

A description will be given of how a path is generated with and without taking the presence of the target object into consideration in the automated driving mode. FIGS. 5A to 5D are diagrams each illustrating an example of a path generated by the path generating unit 118. As illustrated in FIG. 5A, the path generating unit 118 sets expected target locations K(1), K(2), K(3), . . . corresponding to time points at intervals of a predetermined period Δt from the current time as a path (target path) of the vehicle M by using the current location of the vehicle M as a reference. Hereinafter, these expected target locations are simply referred to as "expected target locations K" when they are not particularly distinguished from one another. For example, the number of expected target locations K is determined in accordance with a target period T. For example, when the target period T is 5 seconds, the path generating unit 118 sets the expected target locations K along a line extending at the center of the current lane at intervals of the predetermined period Δt (0-1 second, for example) in the target period of 5 seconds and determines the intervals between the plurality of expected target locations K on the basis of the traveling mode. The path generating unit 118 may derive the line extending at the center of the current lane from information concerning the lane width included in the map information 142 or may obtain such information from the map information 142 if the map information 142 includes information concerning the location of the center of the current lane.

For example, when the constant-speed mode is selected as the traveling mode by the action plan generating unit 116, the path generating unit 118 generates a path by setting a plurality of expected target locations K at equal intervals as illustrated in FIG. 5A.

Figure 5B:
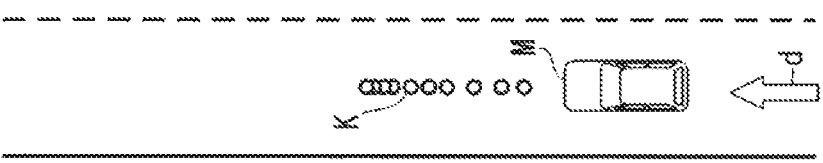
Figure 5A:
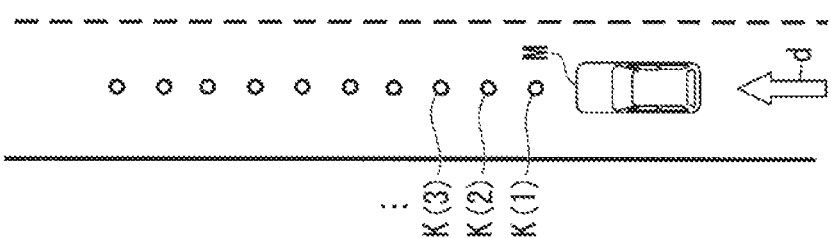

In addition, when the deceleration mode is selected as the traveling mode by the action plan generating unit 116 (including the case where the preceding vehicle decelerates when the follow mode is carried out), the path generating unit 118 generates a path by setting the interval between the expected target locations K that are to be reached earlier to be larger and by setting the interval between the expected target locations K that are to be reached later to be smaller as illustrated in FIG. 5B. In such a case, the preceding vehicle; a point such as a merging point, a branching point, or a target point; or an obstacle may be set as an object OB. Since a distance between the current location of the vehicle M at the corresponding time point and an expected target location K that is to be reached by the vehicle M later gradually decreases, the drive control unit 120 (described later) decelerates the vehicle M.

In addition, when the curve mode is selected as the traveling mode, the path generating unit 118 generates a path by arranging the plurality of expected target locations K while changing their positions in a direction perpendicular to the traveling direction of the vehicle M (positions in the lane width direction), for example, in accordance with the curvature of the road as illustrated in FIG. 5C. In addition, when an obstacle, such as a person or a stationary vehicle, is present ahead of the vehicle M on the road as illustrated in FIG. 5D, the action plan generating unit 116 selects the obstacle avoiding mode as the traveling mode. In this case, the path generating unit 118 generates a path by arranging the plurality of expected target locations K such that the vehicle M travels while avoiding this obstacle (object OB).

Lane Changing Event

A lane changing event will be described next. The path generating unit 118 identifies a vehicle that is traveling ahead of the vehicle M on an adjacent lane, which is adjacent to the current lane where the vehicle M is traveling and to which the vehicle M is to move, and identifies a vehicle that is traveling behind the vehicle M on the adjacent lane. The path generating unit 118 then sets a target position range TA between these vehicles. A description will be given below by referring to a vehicle that is traveling ahead of the vehicle M on the adjacent lane as a front reference vehicle and by referring to a vehicle that is traveling behind the vehicle M on the adjacent lane as a rear reference vehicle. The target position range TA is a relative position range based on the positional relationship among the vehicle M, the front reference vehicle, and the rear reference vehicle.

Figure 6:
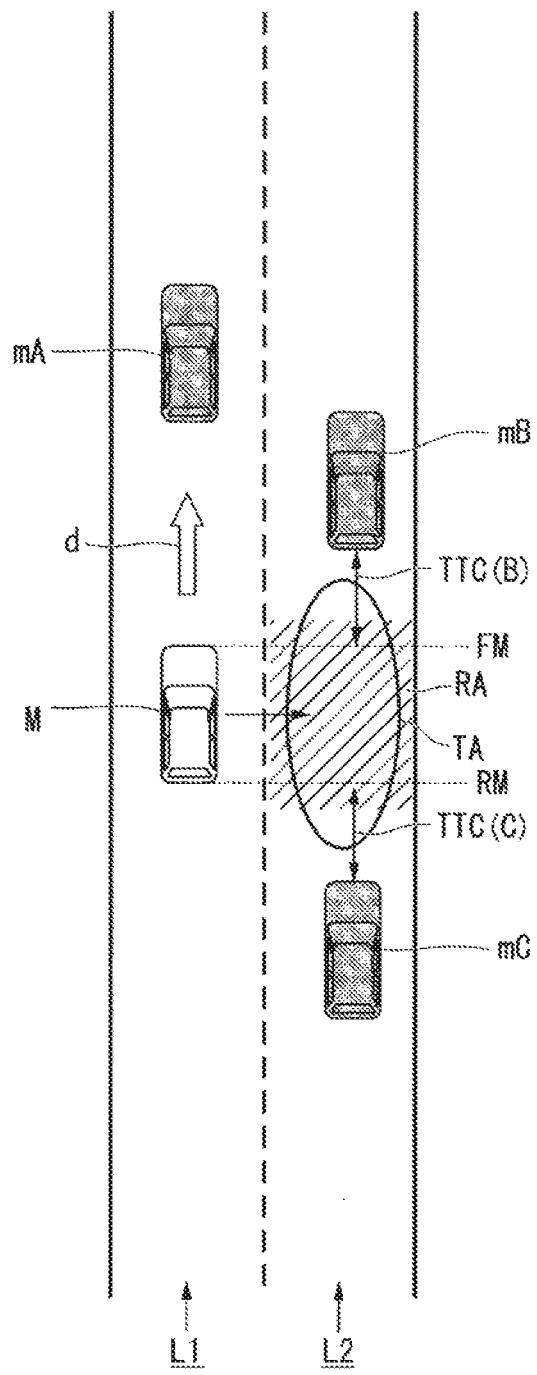
FIG. 6 is a diagram illustrating how a target position range is set.

FIG. 6 is a diagram illustrating how the target position range TA is set. FIG. 6 depicts a preceding vehicle mA, a front reference vehicle mB, and a rear reference vehicle mC. FIG. 6 also depicts an arrow d that represents a traveling (moving) direction of the vehicle M, the current lane L1, and an adjacent lane L2. In the case of the example illustrated in FIG. 6, the path generating unit 118 sets the target position range TA between the front reference vehicle mB and the rear reference vehicle mC on the adjacent lane L2.

Then, the path generating unit 118 determines whether it is possible to perform lane changing to the target position range TA (i.e., between the front reference vehicle mB and the rear reference vehicle mC). For example, the path generating unit 118 determines that it is possible to perform lane changing if there is a space where no nearby vehicle is present in a restrained area RA set on the adjacent lane and time-to-collision TTC for the vehicle M and the front reference vehicle mB and time-to-collision TTC for the vehicle M and the rear reference vehicle mC are larger than respective thresholds. If it is determined that it is not possible to perform lane changing, the path generating unit 118 sets the target position range TA again. At that time, a timing at which the target position range TA that satisfies lane changing conditions becomes settable may be waited for, or the target position range TA may be set to be in front of the front reference vehicle mB or behind the rear reference vehicle mC and speed control may be performed so that the vehicle M is located side by side with the target position range TA.

As illustrated in FIG. 6, the path generating unit 118 projects the vehicle M to the adjacent lane L2 to which the vehicle M is to move and sets the restrained area RA having a small marginal distance in front and behind. The restrained area RA is set to extend from one transversal end to the other transversal end of the adjacent lane L2.

If there is no nearby vehicle in the restrained area RA, the path generating unit 118 assumes an extending line FM and an extending line RM that are obtained by virtually extending the front end and the rear end of the vehicle M to the adjacent lane L2 to which the vehicle M is to move, for example. The path generating unit 118 calculates time-to-collision TTC(B) for the extending line FM and the front reference vehicle mB and time-to-collision TTC(C) for the extending line RM and the rear reference vehicle mC. The time-to-collision TTC(B) is derived by dividing the distance between the extending line FM and the front reference vehicle mB by the relative speed between the vehicle M and the front reference vehicle mB. The time-to-collision TTC (C) is derived by dividing the distance between the extending line RM and the rear reference vehicle mC by the relative speed between the vehicle M and the rear reference vehicle mC. The path generating unit 118 determines that it is possible to perform lane changing if the time-to-collision TTC(B) is larger than a threshold Th(B) and the time-to-collision TTC(C) is larger than a threshold Th(C). The thresholds Th(B) and Th(C) may be the same value or different values.

If it is determined that it is possible to perform lane changing, the path generating unit 118 generates a path for lane changing. FIG. 7 is a diagram how a path for lane changing is generated. For example, the path generating unit 118 assumes that the preceding vehicle mA, the front reference vehicle mB, and the rear reference vehicle mC travel in accordance with a predetermined speed model, and generates a path on the basis of the predetermined speed model of these three vehicles and the speed of the vehicle M such that the vehicle M is to be located between the front reference vehicle mB and the rear reference vehicle mC at a certain future time point without interfering with the preceding vehicle mA. For example, the path generating unit 118 smoothly links the current location of the vehicle M and the location of the front reference vehicle mB at the certain future time point or the lane changing end point at the center of the lane to which the vehicle M is to move by using a polynomial curve, such as a spline curve, and arranges the predetermined number of expected target locations K along this curve at equal or unequal intervals. At that time, the path generating unit 118 generates a path such that at least one of the expected target locations K is located within the target position range TA.

Then, the path generating unit 118 determines whether a path that satisfies set conditions has been successfully generated. The set conditions may be, for example, the acceleration/deceleration, the steered angle, and the expected yaw rate at each point along the path being within respective predetermined ranges. If a path that satisfies the set conditions has been successfully generated, the path generating unit 118 outputs information of the path for lane changing to the drive control unit 120 to cause a lane changing to be performed.

Drive Control

The drive control unit 120 sets the driving mode to the automated driving mode, the manual driving mode, or the like under the control performed by the switching control unit 130 and controls targets including part or all of the driving force output system 90, the steering system 92, and the braking system 94 in accordance with the set driving mode. Note that the drive control unit 120 may appropriately adjust the determined control amounts in accordance with the detection results obtained by the vehicle sensors 60.

If the vehicle M carries out the automated driving mode, the drive control unit 120 controls the driving force output system 90, the steering system 92, and the braking system 94 such that the vehicle M travels along the path generated by the path generating unit 118 at expected timing, for example. If the vehicle M carries out the manual driving mode, the drive control unit 120 outputs operation detection signals input thereto from the operation detection sensors to the driving force output system 90, the steering system 92, and the braking system 94 without processing them, for example. If the vehicle M carries out the semi-automated driving mode, the drive control unit 120 may control the steering system 92 so that the vehicle M travels along the path generated by the path generating unit 118 or may control the driving force output system 90 and the braking system 94 so that the vehicle M travels at a predetermined speed, for example.

Switching Control

The switching control unit 130 switches the driving mode on the basis of the driving mode specifying signal input thereto from the switch 80. The switching control unit 130 also switches the driving mode on the basis of an operation of the operation device for instructing acceleration, deceleration, or steering. The switching control unit 130 performs handover control for shifting from the automated driving mode (first driving mode) to the manual driving mode (second driving mode). The switching control unit 130 also restrains shifting from the automated driving mode to the manual driving mode in accordance with predetermined conditions.

For example, the switching control unit 130 includes a handover control unit 132 and a restraint control unit 134. The handover control unit 132 instructs the automated driving control unit 110 to perform shifting from the automated driving mode to the manual driving mode if an operation amount and/or an operation period of at least one operation device out of the operation devices such as the accelerator pedal 70, the brake pedal 72, and the steering wheel 74 exceeds respective thresholds set for the operation amount and the operation period of the operation device, and controls handover (switching). The operation amount is detectable by using an operation detection sensor corresponding to each operation device (such as the accelerator opening sensor 71, the brake depression amount sensor (brake switch) 73, or the steering-wheel steering angle sensor 75). The operation amount is some or all of the accelerator opening, the brake depression amount, the steering angle of the steering wheel, and the steering torque or an amount of change in these parameters. The operation period is obtainable by measuring a period for which each of the operation devices has been operated, for example. The handover control unit 132 may perform control to perform switching from the automated driving mode to the manual driving mode and terminate the automated driving mode if the change in the vehicle speed of the vehicle M exceeds a predetermined threshold as a result of the operation of the aforementioned operation device(s) (for example, an acceleration operation or a deceleration operation).

For example, there are cases where the occupant of the vehicle performs inappropriate manual driving by using the operation device(s) while the automated driving mode is carried out. For example, such cases include a case where the occupant of the vehicle M performs a manual steering operation for staying on the lane instead of changing the lane or performs a manual operation for accelerating the vehicle M when it is necessary to immediately change the lane because the distance between the vehicle M and the preceding vehicle mA is decreasing. In addition, such cases include a case where the occupant of the vehicle M performs an operation, such as an operation for changing the lane, when the vehicle M is caused to stay on the lane instead of changing the lane because there is another vehicle side by side with the vehicle M, for example. Note that examples of the inappropriate manual driving are not limited to these example cases.

In order to avoid dangerous traveling of the vehicle M due to the operation of the operation device(s) performed by the occupant of the vehicle M, control is performed to restrain shifting (handover) from automated driving to manual driving in the embodiment. For example, the restraint control unit 134 calculates, for each of time points at intervals of a predetermined period, a deviation of an estimated location that is estimated for the time point on the basis of a manual acceleration, deceleration, or steering operation performed by the occupant of the vehicle M from the target location set for the time point by the path generating unit 118. The restraint control unit 134 then determines whether the estimated path contradicts the action plan generated by the action plan generating unit 116 on the basis of a comparison result obtained by comparing a value based on the calculated deviation with a threshold. The restraint control unit 134 also restrains the handover control unit 132 from performing shifting from the automated driving mode to the manual driving mode if the estimated path contradicts the generated action plan. The action plan is classified at least on the basis of whether lane changing is to be performed. With such a configuration, the path that denies the lane changing action plan is successfully determined as a path that contradicts the action plan.

There may be cases where restraint control is not desirable even if the estimated path contradicts the action plan depending on the traveling situation of the vehicle M. For example, such cases include a case where the necessity of lane changing arises in order to go to a destination different from the set destination. In such a case, the restraint control unit 134 does not restrain the handover control unit 132 from performing shifting from the automated driving mode to the manual driving move even if the estimated path contradicts the path based on the action plan information 146.

Figure 8A:
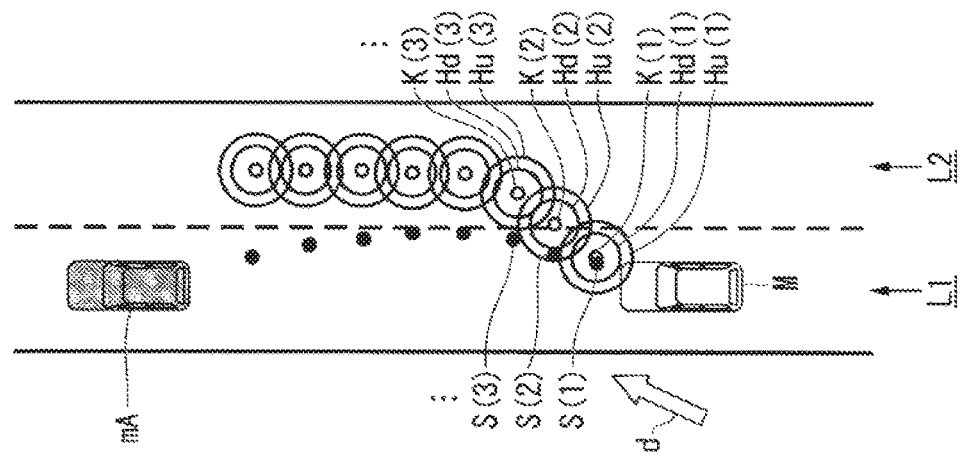
FIGS. 8A to 8C are diagrams each illustrating an example of how a steering operation is restrained.
Figure 8B:
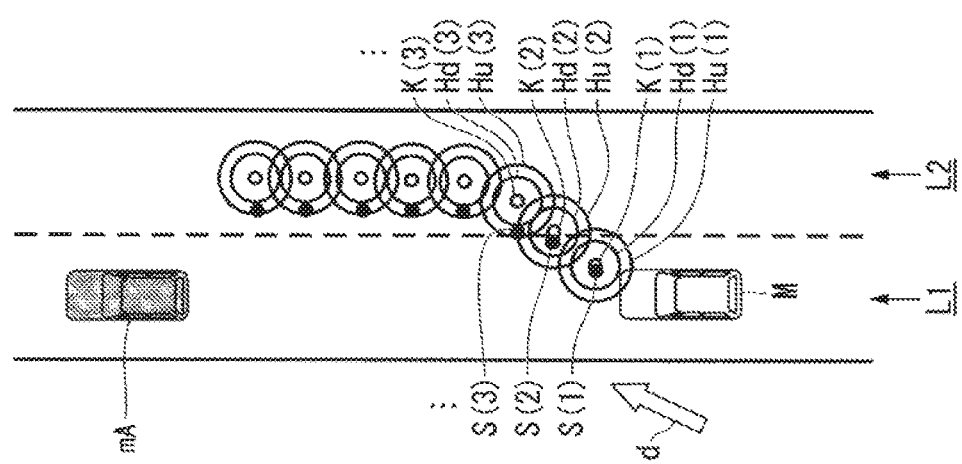
Figure 8C:
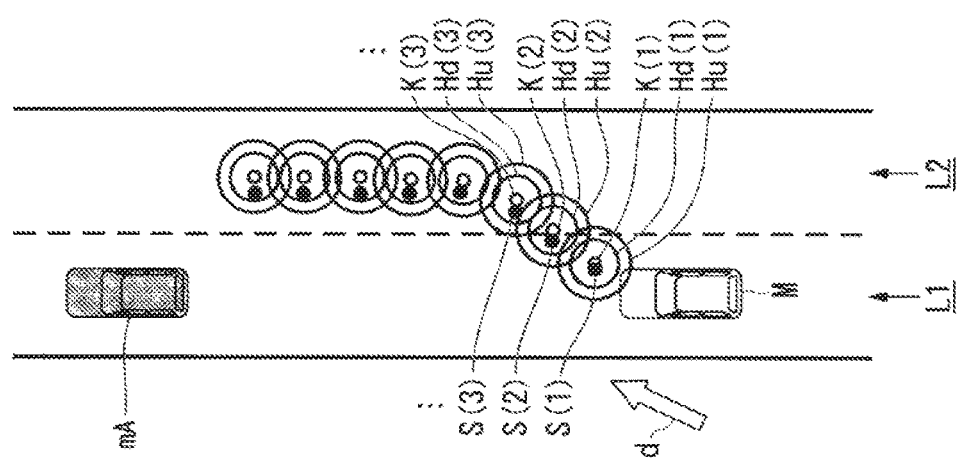

FIGS. 8A to 8C are diagrams each illustrating an example of how a steering operation is restrained. For example, when the occupant of the vehicle M performs a steering operation while the automated driving mode is carried out, the restraint control unit 134 sets, as the estimated path of the vehicle M, estimated locations S(1), S(2), S(3), . . . corresponding to respective time points at intervals of a predetermined period Δt that are expected if the vehicle M travels in accordance with the operation performed by the occupant of the vehicle M, by using the current location of the vehicle M as a reference. Hereinafter, these estimated locations S(1), S(2), S(3), . . . are simply referred to as "estimated locations S" when they are not particularly distinguished from one another.

The restraint control unit 134 sets upper-limit ranges Hu(1), Hu(2), Hu(3), . . . and lower-limit ranges Hd(1), Hd(2), Hd(3), . . . with respect to the respective target locations K (center) that correspond to the respective time points at intervals of the predetermined period Δt and that are based on the action plan information 146 generated by the path generating unit 118 described above. The periphery of each upper-limit range Hu and the periphery of each lower-limit range Hd respectively correspond to an upper-limit threshold and a lower-limit threshold. Hereinafter, these predetermined ranges (upper-limit ranges Hu and lower-limit ranges Hd) are simply referred to as "predetermined ranges H" when they are not particularly distinguished from one another. The predetermined ranges H are illustrated as circles having a predetermined radius with respect to the respective target locations K set as the center in the examples of FIGS. 8A to 8C; however, the shape of the predetermined ranges H is not limited to this circular shape, and the size and shape of the predetermined ranges H may be set in accordance with the speed, the weight, and the like of the vehicle M.

The restraint control unit 134 determines whether to perform restraint control on the basis of where the corresponding estimated location S is located with respect to the predetermined ranges H (upper-limit range Hu and lower-limit range Hd) that are set for each of the time points at intervals of the predetermined period and of whether the estimated path contradicts the target path based on the action plan. It is determined that the estimated path contradicts the target path if a path for not changing the lane is estimated from the steering operation performed by the occupant of the vehicle M, while the vehicle M is changing the lane in accordance with automated driving, for example. It is determined that the estimated path does not contradict the target path if a path for changing the lane is estimated from the steering operation performed by the occupant of the vehicle M while the vehicle M is changing the lane in accordance with automated driving. The example cases are not limited to these cases. For example, it may be determined that the estimated path contradicts the target path if a path for approaching the preceding vehicle mA is estimated from an acceleration operation performed by the occupant of the vehicle M for the vehicle M that is decelerating because the vehicle M has come close to the preceding vehicle mA during automated driving. It may be determined whether the estimated path contradicts the target path by using the steering operation and the acceleration operation in combination. The restraint control unit 134 restrains the occupant's manual operation for one of or both of acceleration/deceleration and steering of the vehicle M in accordance with the determination result described above.

For example, the examples of FIGS. 8A to 8C illustrate the case where lane changing is performed in a traveling direction d on the basis of the action plan. If the occupant of the vehicle M performs a steering operation to move the vehicle M to the left in such a situation, the restraint control unit 134 performs restraint control. In this case, the restraint control unit 134 estimates estimated locations S for later time points at intervals of the predetermined period on the basis of the operation performed by the occupant of the vehicle M. The restraint control unit 134 also sets the predetermined ranges H (upper-limit ranges Hu and lower-limit ranges Hd) by using the respective target locations K generated by the path generating unit 118. The restraint control unit 134 then restrains switching (handover) to manual driving on the basis of a positional relationship between each of the estimated locations S and the corresponding predetermined ranges H (upper-limit range Hu and lower-limit range Hd).

For example, if the estimated location S estimated from the operation amount by which the operation device has been operated by the occupant of the vehicle M is located within the lower-limit range Hd and a difference (deviation) from the path (target path) of the target locations K is small as illustrated in FIG. 8A, the restraint control unit 134 performs control so that handover is not performed. If the estimated location S estimated from the operation amount is larger than (exceeds) the lower-limit range Hd and is smaller than or equal to (is located within) the upper-limit range Hu and the estimated path contradicts the action plan as illustrated in FIG. 8B, the restraint control unit 134 restrains switching (handover). When performing restraint control, the restraint control unit 134 notifies, by using the indicator device 82 or the like, the occupant of the vehicle M of information indicating that the manual operation is restrained. This configuration successfully causes the occupant of the vehicle to recognize an inappropriate steering operation in terms of traveling.

If the estimated location S estimated from the operation amount exceeds the upper-limit range Hu as illustrated in FIG. 8C, the restraint control unit 134 does not restrain switching (handover), and manual driving control in which the operation performed by the occupant of the vehicle M is prioritized is performed.

Figure 9:
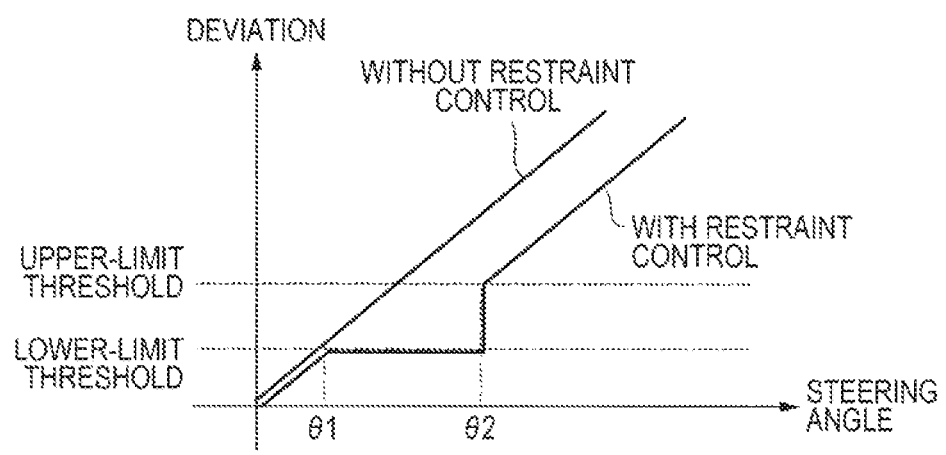
FIG. 9 is a diagram for describing how restraint control is performed based on a relationship between a deviation and a steering angle during automated driving.

FIG. 9 is a diagram illustrating how restraint control is performed based on a relationship between the deviation and the steering angle during automated driving. In the graph of FIG. 9, the horizontal axis represents the steering angle obtained by the steering-wheel steering angle sensor 75, and the vertical axis represents the deviation of the estimated path from the target path based on the action plan. In the example of FIG. 9, the deviation increases in proportion to the steering angle when restraint control according to the embodiment is not performed. Note that the example of FIG. 9 illustrates how restraint control is performed in a certain situation during automated driving.

In the case where restraint control according to the embodiment is performed based on the actual deviation, switching to the manual driving mode is restrained, for example, if the estimated deviation exceeds the lower-limit threshold when the steering angle becomes equal to θ1 and the estimated path contradicts the action plan, and consequently drive control is performed at the deviation in the automated driving mode (the deviation equal to the lower-limit threshold in the example of FIG. 9). If the estimated deviation exceeds the upper-limit threshold when the steering angle becomes equal to θ2, the restraint is cancelled at that time point, switching from the automated driving mode to the manual driving mode is performed, and consequently drive control corresponding to an increase in the deviation is performed in the manual driving mode.

FIGS. 10A to 10C are diagrams each illustrating an example of how the speed is regulated in response to an operation of the accelerator pedal 70. In the examples of FIGS. 10A to 10C, switching from automated driving to manual driving is restrained in accordance with an operation amount of the acceleration operation performed by the occupant of the vehicle M that is traveling in the traveling (moving) direction a based on the action plan. The examples of FIGS. 10A to 10C illustrate estimated locations S estimated based on the operation amount of the acceleration operation and the predetermined ranges H (upper-limit ranges Hu and lower-limit ranges Hd) as in the examples illustrated in FIGS. 8A to 8C described above.

For example, if the estimated location S estimated from the operation amount (acceleration operation) of the operation device performed by the occupant of the vehicle M is within the lower-limit range Hd and the difference (deviation) from the path (target path) of the target locations K is small as illustrated in FIG. 10A, the restraint control unit 134 performs control so that handover is not performed. If the estimated location S estimated from the operation amount is larger than (exceeds) the lower-limit range Hd and is smaller than or equal to (is located within) the upper-limit range Hu and the estimated path contradicts the action plan as illustrated in FIG. 10B, the restraint control unit 134 restrains switching (handover). When performing restraint control, the restraint control unit 134 notifies, by using the indicator device 82 or the like, the occupant of the vehicle M of information indicating that the manual operation is restrained. This configuration successfully causes the occupant of the vehicle to recognize an inappropriate acceleration operation in terms of traveling. Accordingly, a risk of collision or the like during switching (handover) is successfully avoided.

If the estimated location S estimated from the operation amount exceeds the upper-limit range Hu as illustrated in FIG. 10C, the restraint control unit 134 does not restrain switching (handover) and performs manual driving control in which the operation performed by the occupant of the vehicle is prioritized.

Switching (handover) is restrained in response to a steering operation performed by the occupant of the vehicle M in the above-described examples illustrated in FIGS. 8A to 8C and in response to an operation of the accelerator pedal 70 performed by the occupant of the vehicle M in the examples illustrated in FIGS. 10A to 10C; however, the operations are not limited to these ones. For example, the restraint control unit 134 may perform restraint, control according to the type of the operation device when the vehicle M is equipped with another type of the operation device.

The following control may be performed in the embodiment as well as control for restraining switching to manual driving. For example, control for restraining an operation performed by the occupant of the vehicle M may be performed by applying an operation reaction force to the operation device of the vehicle M, such as by increasing the load for rotating the steering wheel 74 gradually (or step by step) or by increasing the load for depressing the accelerator pedal 70 gradually (or step by step).

As described above, the restraint control unit 134 issues a notification by using the indicator device 82 when starting control to restrain shifting (handover). For example, if the indicator device 82 is a display unit, such as an LCD (Liquid Crystal Display) or an organic EL (Electroluminescence) of the vehicle M, the restraint control unit 134 causes a message indicating that shifting (handover) is restrained to be displayed on the screen of the display unit. Note that the display unit may be a head-up display that displays an image within the field of view of the occupant of the vehicle M by reflecting the image on the front windshield of the vehicle M, a display unit of the navigation system 50, or a display unit of an instrument panel that displays the statuses (such as the speed) of the vehicle M. If the indicator device 82 is a speaker, the restraint control unit 134 causes an audio message or an alarming sound indicating that shifting (handover) is restrained to be output from the speaker. If the indicator device 82 is a light-emitting device, such as an LED (Light Emitting Diode) lamp of the vehicle M, the restraint control unit 134 causes the LED lamp to switch on or blink when shifting (handover) is restrained. If the indicator device 82 is a vibrator that vibrates a seat of the vehicle M or the like, the restraint control unit 134 causes the vibrator to vibrate the seat where the occupant of the vehicle M is sitting when shifting (handover) is restrained. The restraint control unit 134 notifies the occupant of the vehicle M by using at least one of the above notification methods; however, the notification method used is not limited to these method. With the above-described control performed by the restraint control unit 134, appropriate switching from automated driving to manual driving is successfully performed when automated driving is shifted to manual driving.

Process Flow

The flow of a process performed by the vehicle control device 100 according to the embodiment will be described below. The following description is given of the flow of a process of controlling switching from the automated driving mode to the manual driving mode in response to an operation performed by the occupant of the vehicle M out of various processes performed by the vehicle control device 100.

FIG. 11 is a flowchart illustrating an example of the switching control process according to the embodiment. In the example of FIG. 11, the switching control unit 130 stands by until an operation performed by the occupant of the vehicle M is accepted during automated driving (step S100). Then, the restraint control unit 134 determines an estimated path of the vehicle M from the operation amount of one of or both of operations for acceleration/deceleration and steering performed by the occupant of the vehicle M (step S102). The restraint control unit 134 calculates a deviation of the estimated path obtained through the processing of step S102 from an expected path (target locations K) generated by the path generating unit 118 based on the action plan information 146 (step S104). The deviation is a difference of the estimated location S from the target location K for each of time points at intervals of the predetermined period Δt; however, the deviation is not limited to this value and may be another indicator value such as an amount of change in the difference obtained at intervals of the predetermined period Δt.

Then, the restraint control unit 134 determines whether the deviation calculated in step S104 is smaller than or equal to the upper-limit threshold (step S106). If the deviation is smaller than or equal to the upper-limit threshold, the restraint control unit 134 determines whether the deviation is larger than the lower-limit threshold (step S108). If the deviation is larger than the lower-limit threshold, the restraint control unit 134 determines whether the above-described estimated path contradicts the action plan based on the action plan information 146 (step S110). If the estimated path contradicts the action plan, the restraint control unit 134 restrains shifting (handover) (step S112) and notifies the occupant of the vehicle M of the restrained state by using the indicator device 82 (step S114).

Then, the restraint control unit 134 determines whether the occupant of the vehicle M has been operating the operation device for a predetermined period or longer (step S116). If the occupant has been operating the operation device for the predetermined period or longer, the restraint control unit 134 causes the handover control unit 132 to perform handover (step S118), and the process of this flowchart ends. The restraint control unit 134 also causes handover to be performed if it is determined in the processing of step S110 that the estimated path does not contradict the action plan. In addition, if it is determined in the processing of step S116 that the occupant has not been operating the operation device for the predetermined period or longer, the restraint control unit 134 does not cause the handover control unit 132 to perform handover (S120), and the process of this flowchart ends. The restraint control unit 134 also does not cause handover to be performed also if it is determined in the processing of step S108 that the deviation is smaller than or equal to the lower-limit threshold.

With the vehicle control system 1, the vehicle control method, and the vehicle control program according to the embodiment described above, appropriate switching control from automated driving to manual driving is successfully performed because handover is restrained if the input to the operation device performed by the occupant of the vehicle M contradicts the action plan of the system. For example, it is considered that the occupant of the vehicle M wishes to drive the vehicle M by performing a manual operation if the difference of the estimated location S from the target location K is large and exceeds the upper-limit threshold or if the manual operation is continued for the predetermined period or longer. Thus, such an intention is respected and drive control in which the operation performed by the occupant of the vehicle M is prioritized is successfully implemented in this embodiment. In addition, when the estimated path based on the manual operation does not contradict the action plan, a difference from the expected traveling state of the vehicle M under automated driving is small even if handover is performed. Thus, appropriate switching control from automated driving to manual driving is successfully performed in this embodiment.

While how the present disclosure is embodied has been described by using the embodiment above, the present disclosure is not limited to such an embodiment, and various modifications or replacements may be made within a scope not departing from the essence of the present disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:
1. A vehicle control device comprising:
an action plan generating unit that generates an action plan of a vehicle to a destination such that the vehicle travels along a route to the destination;

an automated driving controller that carries out a first driving mode in which at least one of acceleration-and-deceleration and steering of the vehicle is automatically controlled in accordance with the action plan generated by the action plan generating unit;

an operation device that receives an operation performed by an occupant of the vehicle;

a handover controller that instructs the automated driving controller to perform shifting to a second driving mode when the occupant of the vehicle performs an operation on the operation device to instruct one of or both of acceleration-and-deceleration and steering of the vehicle while the automated driving controller is carrying out the first driving mode, the second driving mode being a mode in which a degree of automated driving is lower than in the first driving mode;

a restraint controller that generates an estimated path of the vehicle to be taken caused by the operation performed by the occupant of the vehicle to instruct one of or both of acceleration-and-deceleration and steering of the vehicle and restrains the handover controller from instructing shifting from the first driving mode to the second driving mode if the generated estimated path contradicts the action plan generated by the action plan generating unit; and a path generating unit that generates an expected target path of the vehicle on the basis of a traveling mode determined by the action plan generating unit, wherein the restraint controller determines whether the generated estimated path contradicts the action plan generated by the action plan generating unit by using the expected target path generated by the path generating unit and the generated estimated path, wherein the path generating unit generates the expected target path by sampling target locations expected to be reached by the vehicle at respective time points at a predetermined interval, and wherein the restraint controller:

calculates, for each of the time points at the predetermined interval, a deviation between the target location determined by the path generating unit for the time point and an estimated location for the time point estimated on the basis of the operation performed by the occupant of the vehicle to instruct one of or both of acceleration-and-deceleration and steering of the vehicle, and determines whether the estimated path contradicts the action plan by comparing a value based on the calculated deviation with a threshold.

2. The vehicle control device according to claim 1, wherein the action plan is classified at least on the basis of whether lane changing is to be performed.

3. The vehicle control device according to claim 1, wherein the restraint controller does not restrain the handover controller from instructing shifting from the first driving mode to the second driving mode if the value based on the deviation exceeds an upper-limit threshold even in a case where it is determined that the estimated path contradicts the action plan.

4. The vehicle control device according to claim 3, wherein the restraint controller performs control such that the handover controller does not instruct shifting from the first driving mode to the second driving mode if the value based on the deviation is smaller than or equal to a lower-limit threshold.

5. The vehicle control device according to claim 4, wherein the restraint controller performs control to restrain an operation performed by the occupant of the vehicle by applying an operation reaction force to the operation device if the value based on the deviation is larger than the lower-limit threshold and is smaller than or equal to the upper-limit threshold.

6. The vehicle control device according to claim 4, further comprising:

an output unit that outputs information, wherein the restraint controller restrains an operation by the operation device if the value based on the deviation is larger than the lower-limit threshold and is smaller than or equal to the upper-limit threshold and causes the output unit to output information indicating that the operation is restrained.

7. The vehicle control device according to claim 1, wherein the restraint controller determines whether an action of the vehicle according to the generated estimated path contradicts the action plan generated by the action plan generating unit, and if so, the restraint controller restrains the handover controller from instructing the shifting.

8. A vehicle control method performed by a computer mounted in a vehicle, comprising steps of:

(i) generating, by the computer, an action plan of the vehicle to a destination such that the vehicle travels along a route to the destination;

(ii) carrying out, by the computer, a first driving mode in which at least one of acceleration-and-deceleration and steering of the vehicle is automatically controlled in accordance with the generated action plan;

(iii) instructing, by the computer, shifting to a second driving mode when an occupant of the vehicle performs an operation on an operation device to instruct one of or both of acceleration-and-deceleration and steering of the vehicle while the first driving mode is carried out, the second driving mode being a mode in which a degree of automated driving is lower than in the first driving mode, the operation device being a device that receives an operation performed by the occupant of the vehicle;

(iv) generating, by the computer, an expected target path of the vehicle on the basis of a traveling mode, by sampling target locations expected to be reached by the vehicle at respective time points at a predetermined interval; and (v) generating, by the computer, an estimated path of the vehicle to be taken caused by the operation performed by the occupant of the vehicle to instruct one of or both of acceleration-and-deceleration and steering of the vehicle, and restraining, by the computer, shifting from the first driving mode to the second driving mode if the generated estimated path contradicts the action plan, wherein the step (v) comprises determining whether the generated estimated path contradicts the action plan by using the generated expected target path and the generated estimated path, wherein the step (v) further comprises:

calculating, for each of the time points at the predetermined interval, a deviation between the target location for the time point and an estimated location for the time point estimated on the basis of the operation performed by the occupant of the vehicle to instruct one of or both of acceleration-and-deceleration and steering of the vehicle, and determining whether the estimated path contradicts the action plan by comparing a value based on the calculated deviation with a threshold.

9. The vehicle control method according to claim 8, further comprising determining by the computer whether an action of the vehicle according to the generated estimated path contradicts the action plan generated by the action plan generating unit, and if so, restraining shifting from the first driving mode to the second driving mode.

10. A non-transitory computer readable storage medium storing a vehicle control program that causes an onboard computer to execute a process, the process comprising steps of:
   (i) generating an action plan of the vehicle to a destination such that the vehicle travels along a route to the destination;
   (ii) carrying out a first driving mode in which at least one of acceleration-and-deceleration and steering of the vehicle is automatically controlled in accordance with the generated action plan;
   (iii) instructing shifting to a second driving mode when an occupant of the vehicle performs an operation on an operation device to instruct one of or both of acceleration-and-deceleration and steering of the vehicle while the first driving mode is carried out, the second driving mode being a mode in which a degree of automated driving is lower than in the first driving mode, the operation device being a device that receives an operation performed by the occupant of the vehicle;
   (iv) generating, by the computer, an expected target path of the vehicle on the basis of a traveling mode, by sampling target locations expected to be reached by the vehicle at respective time points at a predetermined interval; and
   (v) generating an estimated path of the vehicle to be taken caused by the operation performed by the occupant of the vehicle to instruct one of or both of acceleration-and-deceleration and steering of the vehicle, and restraining shifting from the first driving mode to the second driving mode if the generated estimated path contradicts the action plan,
   wherein the step (v) comprises determining whether the generated estimated path contradicts the action plan by using the generated expected target path and the generated estimated path,
   wherein the step (v) further comprises:
   calculating, for each of the time points at the predetermined interval, a deviation between the target location for the time point and an estimated location for the time point estimated on the basis of the operation performed by the occupant of the vehicle to instruct one of or both of acceleration-and-deceleration and steering of the vehicle, and
   determining whether the estimated path contradicts the action plan by comparing a value based on the calculated deviation with a threshold.

11. The non-transitory computer readable storage medium according to claim 10, the process further comprising determining whether an action of the vehicle according to the generated estimated path contradicts the action plan generated by the action plan generating unit, and if so, restraining shifting from the first driving mode to the second driving mode.

* * * * *